United States Patent
Ponson et al.

[11] Patent Number: 5,992,598
[45] Date of Patent: Nov. 30, 1999

[54] CLUTCH-RELEASE DEVICE

[75] Inventors: Frédéric Ponson, Luynes; Jean Michel Kromwel, Amiens, both of France

[73] Assignees: SKF France, Clamart; Valeo, Paris, both of France

[21] Appl. No.: 08/975,297

[22] Filed: Nov. 20, 1997

[30] Foreign Application Priority Data

Nov. 29, 1996 [FR] France ................................ 96 14704

[51] Int. Cl.⁶ .......................... F16D 13/44; F16D 19/00
[52] U.S. Cl. ......................................... 192/89.23; 192/98
[58] Field of Search .................................. 192/89.23, 98

[56] References Cited

U.S. PATENT DOCUMENTS

| | | | |
|---|---|---|---|
| 3,963,105 | 6/1976 | Ernst et al. | 192/98 |
| 4,159,052 | 6/1979 | Ernst et al. | 192/98 |
| 4,597,485 | 7/1986 | Braun | 192/70.27 |
| 4,608,741 | 9/1986 | Mallet | 29/450 |
| 4,796,743 | 1/1989 | Hallerback | 192/98 |

FOREIGN PATENT DOCUMENTS

| | | |
|---|---|---|
| 2090935 | 1/1972 | France . |
| 2234485 | 6/1973 | France . |
| 2230896 | 12/1974 | France . |
| 2230897 | 12/1974 | France . |
| 2273977 | 1/1976 | France . |
| 2452634 | 8/1983 | France . |
| 2544429 | 10/1984 | France . |
| 2544430 | 10/1984 | France . |
| 2550294 | 2/1985 | France . |
| 2667121 | 3/1992 | France . |
| 4120643 | 12/1992 | Germany . |

*Primary Examiner*—Charles A. Marmor
*Assistant Examiner*—Tisha D. Waddell
*Attorney, Agent, or Firm*—Smith, Gambrell & Russell, LLP

[57] ABSTRACT

Clutch-release device comprising a centrally holed diaphragm 1 which has a central part cut, by means of slits 5 into fingers 4 that point radially inwards, a thrust rolling bearing 13 and an operating element 14 mounted on a part which is distinct from the one supporting the diaphragm and in at least axial contact with the rolling bearing 13. The latter comprises a rotating race 16, a radial portion 25 of which bears against the internal end of the fingers 4 of the diaphragm 1, a non-rotating race 17, a radial portion 21 of which is in contact with the operating element, and a row of rolling bodies 18. The rotating race 16, made of pressed sheet metal, on its radial portion 25 in contact with the diaphragm 1 comprises at least one axial deformation 26 which is obtained without removing material, and the edges of which are capable of interacting with the flanks of one finger 4 of the diaphragm 1, the deformation 26 being smaller in size than the thickness of a finger 4 of the diaphragm 1.

31 Claims, 5 Drawing Sheets

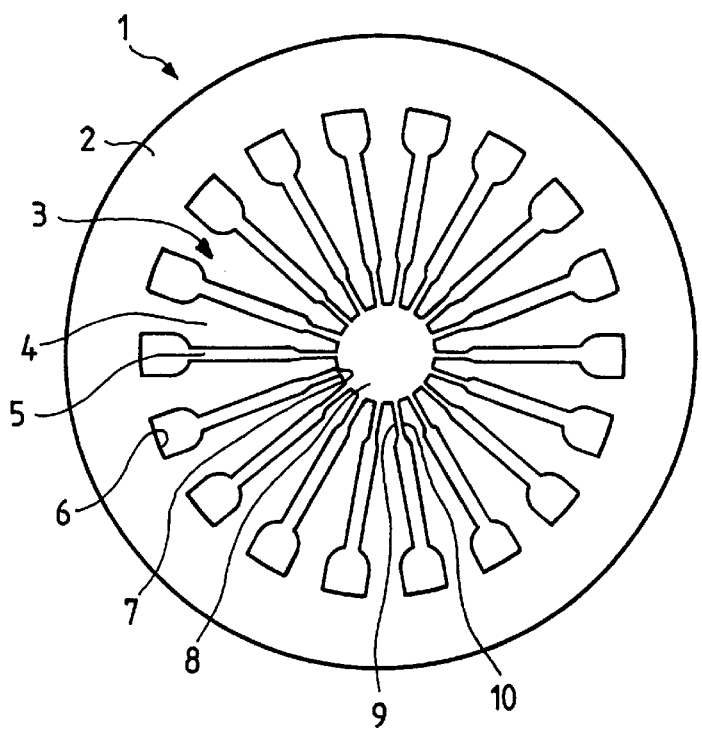
FIG_1
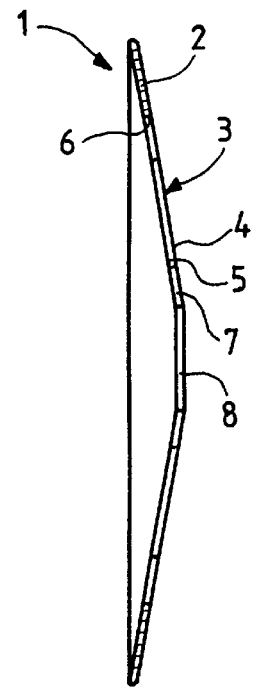
FIG_2
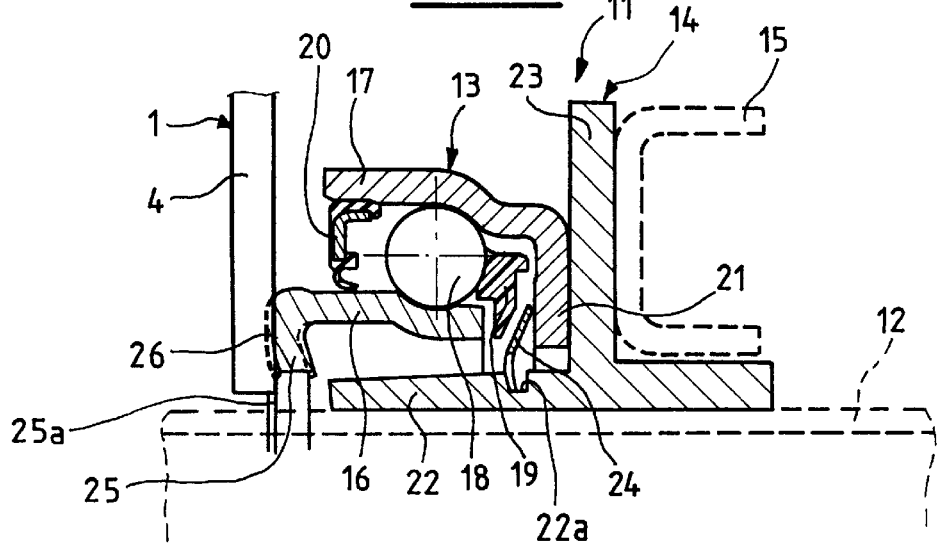
FIG_3

FIG_4
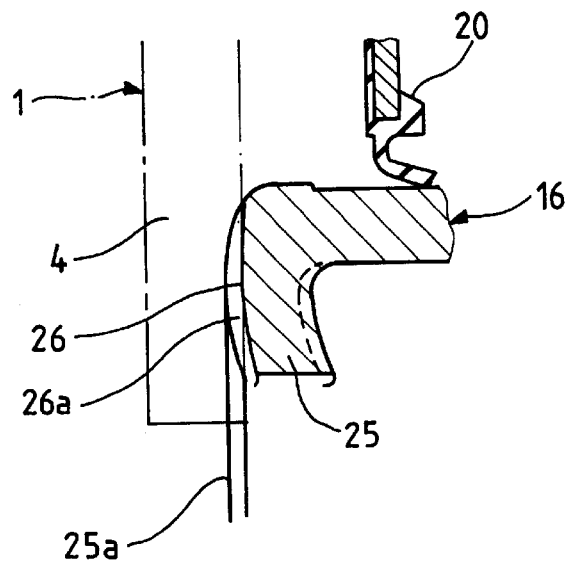
FIG_5
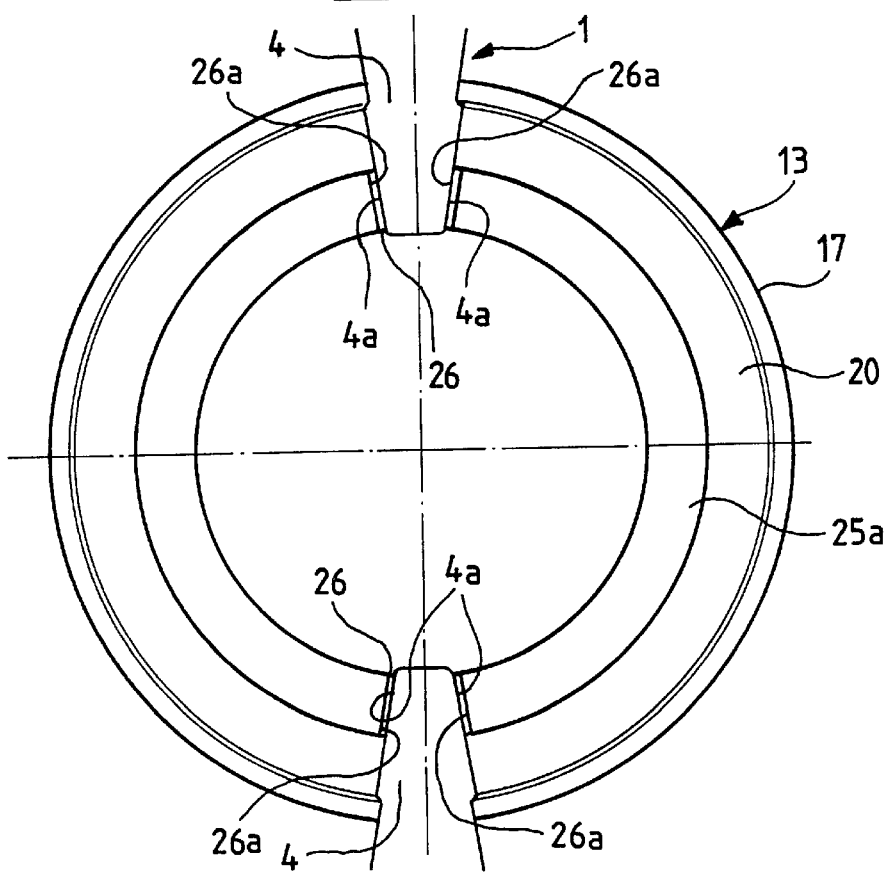

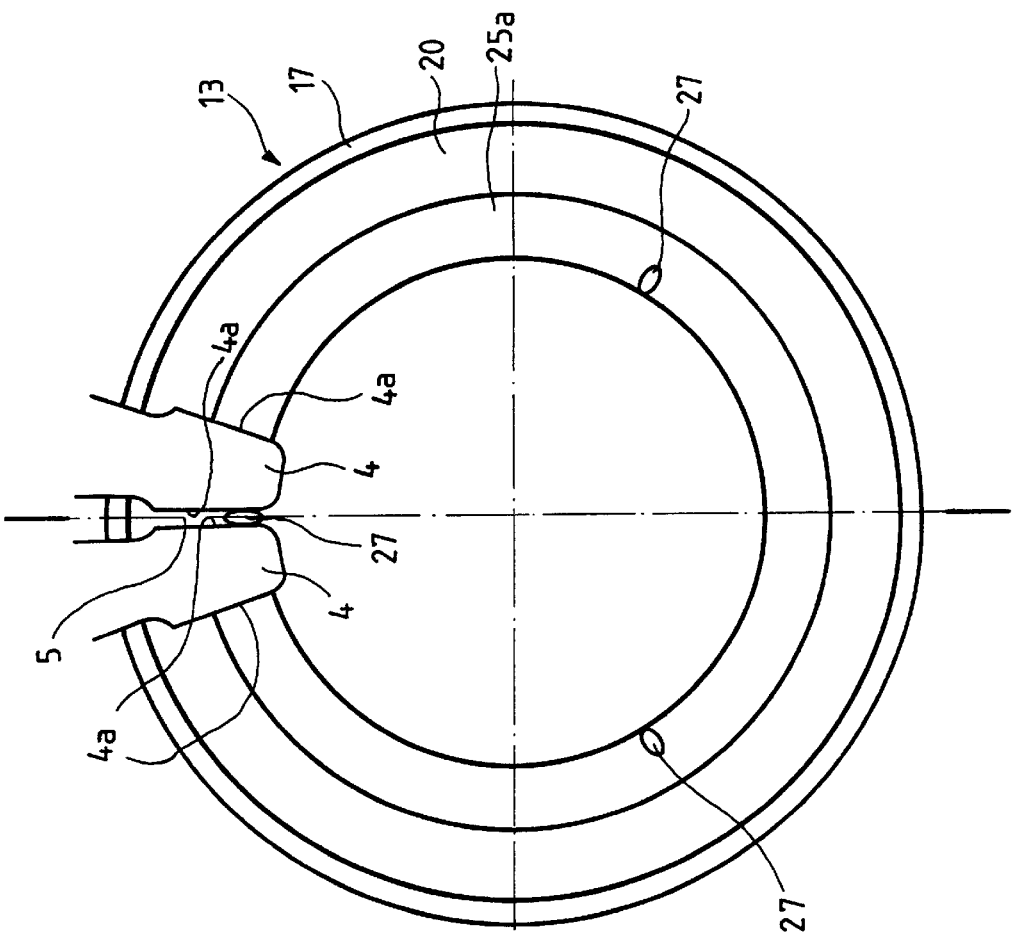
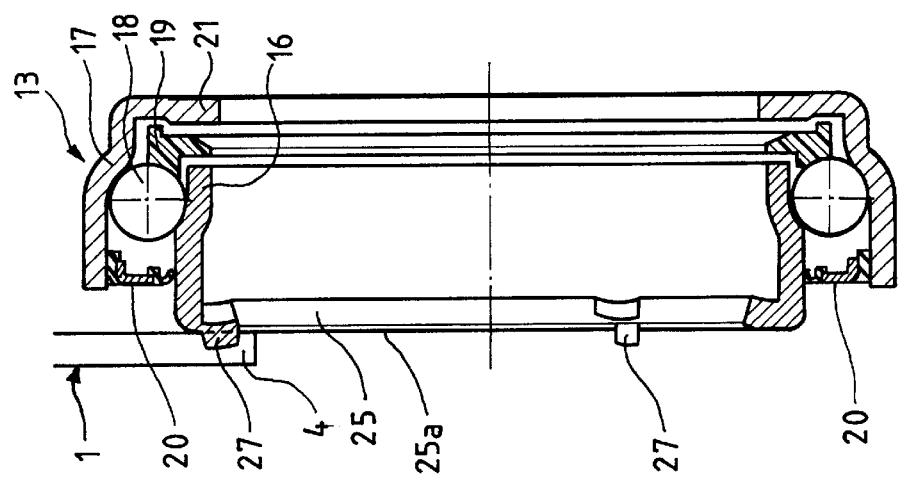

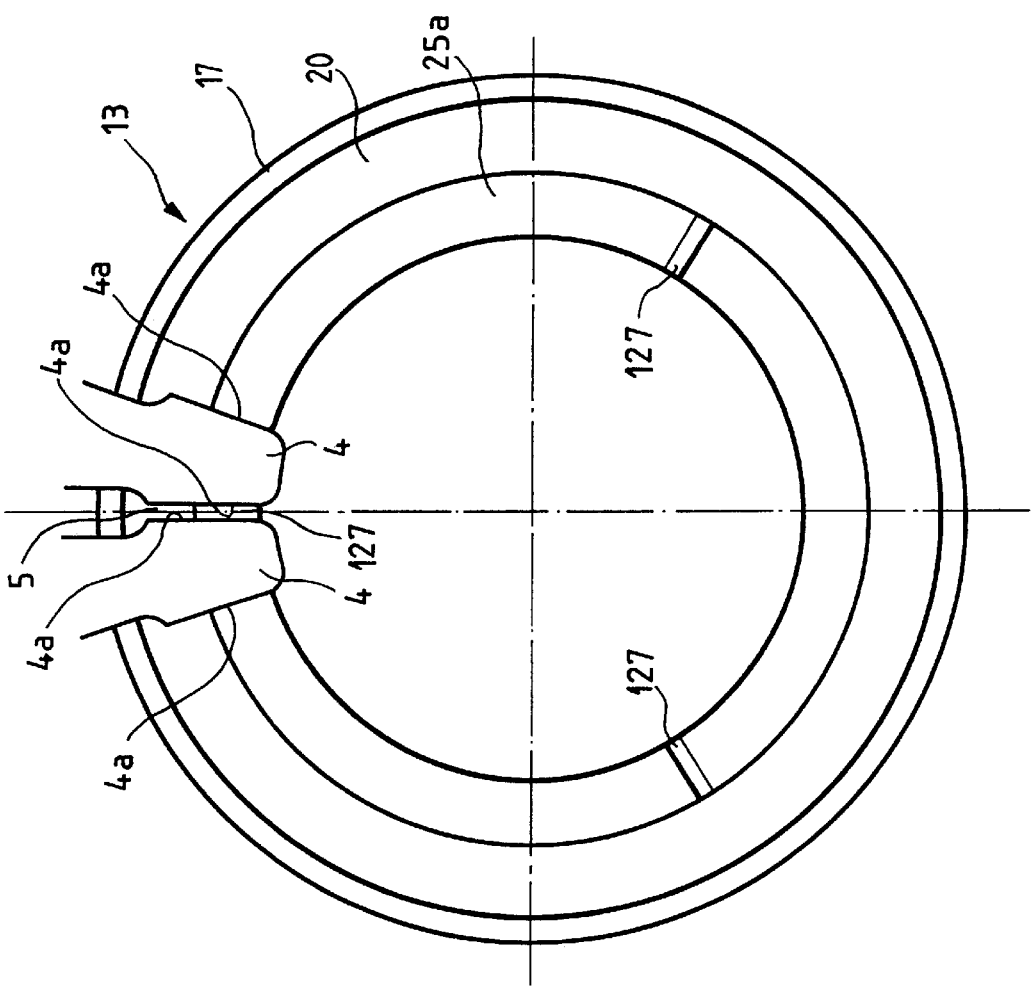
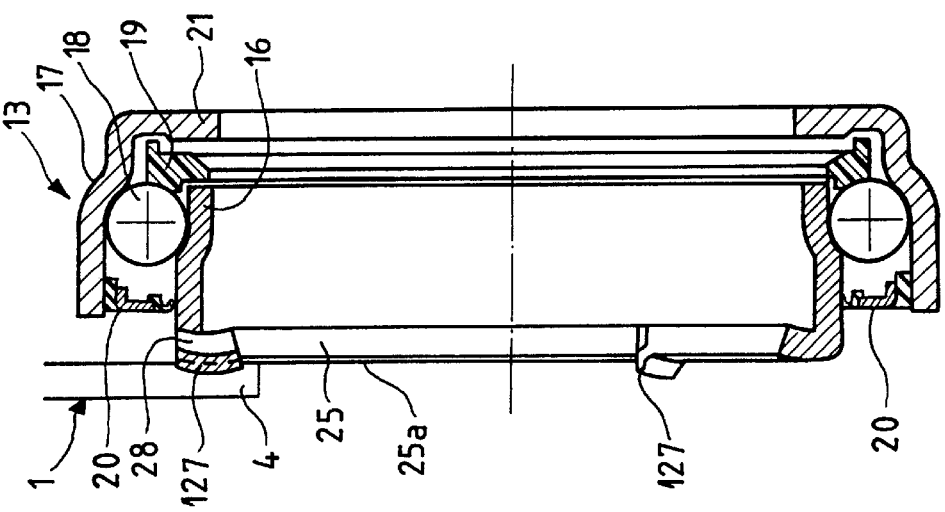

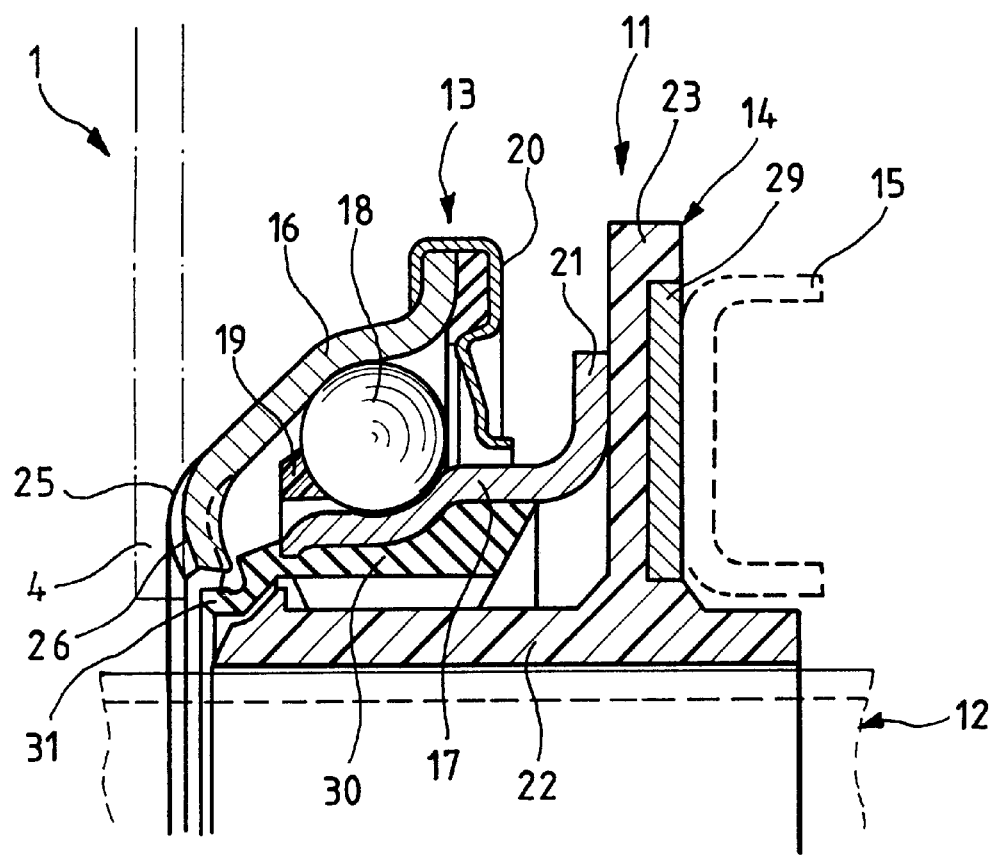
FIG_10

CLUTCH-RELEASE DEVICE

The present invention deals with the field of clutch-release devices for friction clutches of the push-operated type, especially for motor vehicles.

Such devices comprise a clutch-release bearing which bears against the internal end of a centrally holed diaphragm.

The clutch-release bearing comprises a thrust rolling bearing, usually with concentric and coaxial races, with a rotating race which is shaped for local contact with the diaphragm which itself has an external peripheral part in the shape of a Belleville washer extended radially inwards by a central part which is split up into radial fingers separated from their neighbors by blind slits, the closed end or outer end of which consists of widened orifices situated at the internal periphery of the Belleville washer of the diaphragm which in the relaxed condition is frustoconical in shape. The slits open internally into the central hole of the diaphragm. The rotating race acts on the internal end of the diaphragm fingers and has a part which is domed when the diaphragm fingers are flat and a flat annular shape when the diaphragm fingers are domed at heir internal end.

For operating the rolling bearing, the non-rotating race is coupled axially to an operating element which has a central sleeve mounted on a guide tube so that the operating element can be shifted axially with respect to the guide tube through which a driven shaft passes, while the diaphragm rotates as one with a driving shaft. The operating element thus carries the clutch-release bearing.

The non-rotating race of the rolling bearing may be fixed radially with respect to the operating element by being, for example, force-fitted onto the front end of the sleeve of the operating element. As an alternative, the rolling bearing can shift radially with respect to the operating element, the thrust bearing then being called a self-centring clutch-release bearing. The means of coupling the non-rotating race to the operating element then comprise, for example, elastic means with an axial action such as an elastic washer of the Belleville washer type or of the crinkle washer type. As an alternative, there may be hooks or a washer that can be deformed radially like a circlip.

The elastic means bear directly against the operating element or against a cover crimped or clipped to the said operating element to act on the non-rotating race and urge it into contact with a shoulder that forms part of the operating element.

It is also possible to envisage a self-centering device that uses a sleeve made of an elastic material with a radial action inserted radially between the non-rotating race and the operating element.

The operating element is shaped in such a way as to be subjected to the action of control means to make it shift, of the mechanical, hydraulic or electro-mechanical type. These control means allow the clutch-release bearing to be shifted axially with respect to the guide tube.

For example, the guide tube is fixed directly to a stationary part such as the gearbox housing, and the sleeve of the operating element at its rear end has a transverse flange, possibly covered with a bearing plate, on which there act the fingers of a clutch-release fork operated by the clutch pedal with the intervention of a spring, known as a preload spring, in the kinematic chain that runs from the pedal to the fork. This preload spring allows the clutch-release bearing to be kept bearing constantly on the diaphragm in order to reduce wear and increase the life of the bearing. By operating the fork, the operating element is shifted axially along the guide tube in such a way that the clutch-release bearing acts, by pushing, on the internal end of the fingers of the diaphragm, the latter returning the thrust bearing to its initial position as soon as the action on the clutch pedal ceases. As an alternative, the sleeve of the operating element may consist of a piston of a hydraulic control assembly comprising a stationary part, for example fixed to the gearbox housing and defining a blind cavity inside which the piston can travel in a leaktight manner.

As an alternative, the guide tube is threaded and interacts with the sleeve of the operating element that forms a nut, mounted on the guide tube which forms a screw. This tube can rotate and is axially stationary, while the sleeve is prevented from rotating, for example by elastic straps that connect the sleeve to a stationary casing, but can move in terms of translation. The guide tube is then borne by the stationary casing via a rolling bearing. Using a cable, the guide tube is rotated and the sleeve is made to translate. The guide tube can also be rotated by an electric motor secured to a stationary part.

While it is being manufactured, the diaphragm is subject to mechanical operations of cutting it and giving it its conical shape, and to heat-treatment operations, especially tempering, in order to give it the desired shape and the required hardness and elasticity. This results in a number of geometric defects, and in practice, the ends of the diaphragm fingers are not all in the same plane.

Document FR-A-2,234,485 (Ransome Hoffmann Pollard) deals with a conventional clutch in which the diaphragm is mounted under load and bears on a primary fulcrum borne by the centrally holed end face of a cover of hollowed-out shape fixed, for example by screws, to a flywheel that rotates as one with a driving shaft. The primary fulcrum is of annular shape and is produced by pressing the end face of the cover or as an alternative consists of a ring borne by stakes riveted to the end face of the cover and each passing through a widened orifice of the diaphragm to carry a ring, forming a secondary fulcrum, arranged facing the primary fulcrum and inserted between the heads of the stakes and the diaphragm on that side of the latter that faces away from the cover end face.

As an alternative, the stakes are replaced by lugs that are formed by cutting and bending the end face of the cover. The lugs pass through widened orifices in the diaphragm and are bent radially outwards at their free end to form a bend that firmly holds in place a ring that has a rounded part for contact with that face of the diaphragm that faces away from the cover end face in order thus to form the secondary fulcrum. The internal periphery of the Belleville washer is mounted so that it can rock between the primary and secondary fulcrums which face each other. The external periphery of the Belleville washer bears against a fragmented boss borne by the dorsal face of a pressure plate which rotates with the cover while being able to move axially with respect to the cover, generally thanks to tangentially oriented elastic straps.

Friction linings of a friction disc are inserted axially between the flywheel and the front face of the pressure plate. At its internal periphery, the friction disc has a hub so that it can be set in place unable to rotate on a driven shaft. In the context of an application to a motor vehicle, the driven shaft is the gearbox input shaft, and the driving shaft is the vehicle engine crankshaft to which the flywheel is attached.

When the clutch is engaged, the diaphragm bears against the primary fulcrum and against the boss on the pressure plate to urge the latter towards the flywheel and to clamp the friction linings. Torque is thus transmitted from the driving shaft to the driven shaft. To disengage the clutch and interrupt the transmission of torque, the control means are deactivated by shifting the operating element in such a way that the rotating race presses against the diaphragm. The latter then starts to bear on its secondary fulcrum and tilts so that the load it exerts on the pressure plate reduces progressively and then becomes zero. The elastic straps return the pressure plate towards the end face of the cover in order to release the friction linings. The stakes or the lugs are therefore stressed upon each clutch-release operation.

In some cases, it has been observed that despite the return spring there is relative rotation between the diaphragm and the clutch-release bearing, leading to phenomena of wear, especially at the diaphragm fingers which are not as hard as the rotating race.

Document FR-A-2,234,485 proposes to produce a positive drive between the rotating race of the clutch-release bearing, borne by the clutch cover, and the diaphragm. The rotating race is mounted on or in a sleeve fixed to the cover by stakes and has two diametrically opposed projections, each of which penetrates a slit in the diaphragm. This results in a number of drawbacks because the clutch-release bearing is no longer of the standard type, the clutch cover is subject to additional stresses and problems with dynamically balancing the clutch occur because the cover carries the clutch-release bearing. The rotating race of the bearing needs to be relatively bulky because it is mounted as part of a carrier sleeve and experiences additional stresses, especially as it slides axially with respect to the sleeve. It is difficult to use a rotating inner race in direct contact with the diaphragm in this kind of device, without encountering the drawbacks mentioned earlier and without giving the said race and therefore the thrust bearing, significant axial bulk. Finally, the projections have a not insignificant width, and this governs the width that the diaphragm slits need to have.

The object of the present invention is to overcome these various drawbacks and to provide a simple and economical clutch-release device.

The object of the present invention is, in particular, to provide a clutch-release device in which the rotating race, which is thin, is in direct and permanent contact under all circumstances with the diaphragm, the latter having slits the width of which does not depend upon the thrust bearing.

The clutch-release device according to the invention, comprises a diaphragm that has a central hole and is cut into fingers that point radially inwards, a thrust rolling bearing and an operating element mounted on a part which is distinct from the one supporting the diaphragm and in at least axial contact with the rolling bearing. The rolling bearing comprises a rotating race, a radial portion of which bears against the internal end of the fingers of the diaphragm, a non-rotating race, a radial portion of which is in contact with the operating element, and a row of rolling bodies. The rotating race is made of pressed sheet metal and, on its radial portion in contact with the diaphragm comprises at least one axial deformation which is obtained without removing material, and the edges of which are capable of interacting with the flanks of one diaphragm finger, the deformation being smaller in size than the thickness of a diaphragm finger.

The axial deformation could be obtained, for example, using a press.

Thanks to the invention, a clutch-release device is obtained which forms the clutch cover, and a clutch-release bearing of a standard type can be used because the operating element is not borne by the same part as the diaphragm. Only the rotating race of the rolling bearing is modified, and is done so economically because, on the one hand, the rotating race is thin and, on the other hand, the deformations have small axial dimensions. The deformations are produced without removing chips, something that can easily and economically be achieved during the process of stamping out the race using a press. The invention actually makes use of the geometric defects of the diaphragm fingers which allow deformations of small size to be used. The deformation will come into contact with the flank of that one of the diaphragm fingers which is axially offset the most with respect to the others.

Furthermore, the number of deformations needed is very low because once the positive rotational connection has been established between the diaphragm and the rotating race of the thrust bearing, this connection will tend to become stronger as the bearing is operated more.

What actually happens is that each time the clutch is operated there is slight relative radial slippage between the diaphragm fingers and the rotating race of the thrust bearing. The small amount of wear that this causes will, in time, cause the diaphragm fingers to embed slightly in the race of the thrust bearing, thus strengthening the rotational connection between these components.

This embedding phenomenon is made possible because the diaphragm fingers have a hardness which is not insignificant even though it is lower than that of the rotating race which is thin.

Likewise, a rotating race made of pressed sheet metal has a certain capacity for local microdeformations under the action of the diaphragm fingers during clutch-release operations, and this also encourages the embedding phenomenon.

For example, the deformation may consist in upsetting material inwards, towards the rolling bodies of the rolling bearing. This upsetting of material leads to the formation of an indentation in the form of a radial groove with lateral edges parallel to the lateral flanks of a diaphragm finger, the width of the groove slightly exceeding that of a diaphragm finger.

On assembly, the thrust bearing is brought into contact with the diaphragm in some arbitrary circumferential position, and any relative rotation of the diaphragm with respect to the thrust bearing causes one of the fingers, which is one of the ones which are the most axially offset with respect to the others, engage in the indentation, causing a positive rotational connection between the diaphragm and the clutch-release bearing.

As an alternative, the material may be upset outwards, away from the rolling bodies of the said bearing and lead to the formation of an axial protrusion which can engage with an edge of that one of the fingers which is the most axially offset in order to give a positive rotational connection between the diaphragm and the thrust bearing. This protrusion may, for example, form a pin which is radially oblong in shape and the width of which is less than that of a slit forming a circumferential space separating two adjacent diaphragm fingers.

The protrusion can also be obtained by puncturing the sheet leading to the formation of an inclined lug the radial corner edge of which projects.

The diaphragm may have constant-width slits further in than the widened orifices, or slits the width of which decreases at its internal end so as to increase the area for contact between the diaphragm and the rotating race.

The invention is therefore a universal use because the deformation is achieved without removing material and from a thin pressed race. In point of fact even when the material is deformed outwards, the deformation can easily be controlled to make sure that it is less than the width of a narrowed slit. It is for this reason that the deformation in this case is in the form of a pip or a puncture.

As will have been understood, the material is upset prior to the heat-treatment operations on the rotating race which are intended to give it the required hardness.

In one embodiment of the invention, provision is made for the deformation to have an axial height of less than half the thickness of a diaphragm finger.

Advantageously, two diametrically opposed deformations are provided. It is also possible to envisage three deformations uniformly distributed circumferentially. In general, the number of deformations is much lower than the number of diaphragm slits.

The device according to the invention may advantageously be used in combination with a system for taking up clutch wear, and this will guarantee that the width of the slits that circumferentially separate the diaphragm fingers will remain within a range of dimensions irrespective of clutch wear.

The operating element may have a central sleeve for sliding axially along a guide tube secured to a stationary part, for example a gearbox housing distinct from the engine block that carries the diaphragm. As an alternative, the sleeve may form a nut driven in translation by the guide tube which itself forms a screw mounted so that it can rotate.

The operating element may be operated mechanically, for example by a cable or fork, hydraulically, in this case forming a piston, or electromechanically.

These various versions are possible because the operating element is shaped in such a way that it can be mounted on a part distinct from the part that carries the diaphragm. Of course, the rotating race may be the inner or the outer race of the thrust rolling bearing.

The invention will be better understood from studying the detailed description of some embodiments which are taken by way of non-limiting examples and illustrated by the appended drawings, in which:

FIG. 1 is a front elevation of a diaphragm;

FIG. 2 is an axial section through the diaphragm of FIG. 1;

FIG. 3 is an axial half section of a clutch-release device according to the invention;

FIG. 4 is a detail of FIG. 3;

FIG. 5 is a front-on view of the clutch-release device of FIG. 3, in which only those two diaphragm fingers that interact with indentations in the rotating race are depicted;

FIG. 6 is an axial section through a clutch-release device according to a second embodiment of the invention;

FIG. 7 is a front-on view of the clutch-release device of FIG. 6, in which just two diaphragm fingers have been depicted;

FIG. 8 is an axial section through a clutch-release device according to a third embodiment of the invention;

FIG. 9 is a front-on view of the device of FIG. 8, in which just two diaphragm fingers have been depicted; and FIG. 10 is an axial half section of a clutch-release device according to a fourth embodiment of the invention.

As can be seen in FIGS. 1 and 2, the diaphragm 1 comprises an external peripheral part 2 in the form of a Belleville washer which in the relaxed state is frusto-conical, and a central part 3 which extends the external part 2 radially inwards, and which is circularly split up (cut) into radial fingers 4 by cuts that form slits 5. Each slit 5 extends from a widened blind outer end 6 situated at the internal periphery of the peripheral part 2, to an open internal end 7 which is of reduced circumferential width and opens into a central hole 8 which is common to all the slits 5.

The reduction in width of the slits 5 at their open end 7 is obtained, for example, by chopping operations. The two radial edges 9 and 10 of such a slit 5 can be produced in two separate operations, namely a first chopping operation in which first of all one of the edges 9, 10 in question is produced, followed by a second chopping operation in which the other of the said edges, hereafter called flanks 44a is produced.

For reasons of clarity of the drawings, the fingers 4 of the diaphragm 1, as depicted in FIG. 2, are all situated in one and the same frustoconical surface of revolution. However, a real diaphragm 1 will have fingers 4 which are somewhat axially offset in one direction or the other, bearing in mind the aforementioned way in which the diaphragm is made.

As illustrated in FIGS. 3 to 5, the clutch-release device comprises a diaphragm 1, a clutch or thrust bearing 11, and a guide tube 12 which is partially depicted. The thrust bearing 11 is mounted so that it can slide axially on a guide tube 12 mounted on the gearbox housing, not depicted, and therefore on a part which is distinct from the one carrying the diaphragm. The thrust bearing 11 comprises a thrust rolling bearing 13, an operating element 14 subject to the action of a control member 15, here a clutch-release fork. The thrust rolling bearing 13 has a rotating inner race 16, made of thin sheet metal, and a non-rotating outer race 17, also made of thin sheet metal, between which races there is a row of rolling bodies, for example balls 18, held by a cage 19. A seal 20 is fitted to a bore of the outer race 17 on the same side as the diaphragm 1. The outer race 17 has a radial portion 21 on the opposite side to the diaphragm 1.

The operating element 14 comprises a cylindrical portion 22 and a radial collar 23 pointing inwards and against one side of which the radial portion 21 of the outer race 17 bears, and against the other side of which the control member 15 bears via the fingers of the clutch-release fork. The outer race 17 of the thrust rolling bearing 13 is kept in contact with the said radial collar 23 by a bi-conical washer 24, of which the outer edge bears on the radial portion 21 of the outer race 17, and of which the inner edge, which is cut into tabs, is housed in a groove 22a of the cylindrical portion 22 of the operating element 14 in order thus to make the thrust rolling bearing 13 bear axially against the operating element 14.

Thanks to a radial clearance between the races 16, 17 of the thrust rolling bearing and the portion 22 of the operating element 14, the thrust rolling bearing can shift radially in a controlled way with respect to the operating element 14 and thus self-align with respect to the diaphragm during operation.

The rotating inner race 16 of the thrust rolling bearing 13 comprises, at its end pointing towards the diaphragm 1, a radial portion 25 which on its outer edge is provided with a convex rounded surface 25a in contact with the end of the fingers 4 of the diaphragm 1. On the convex surface 25a of the radial portion 25 there are two diametrically opposed deformations forming indentations 26 in the form of radial grooves. The deformation is produced by upsetting inwards over a small thickness the material that forms the radial portion 25. The depth of the indentation 26 is much less than half the thickness of a finger 4 of the diaphragm 1. As soon as there is rotation between the thrust bearing 11 and the diaphragm 1, a finger 4 of the latter lodges itself in the indentation 26 and prevents any subsequent relative rotation between the thrust bearing 11 and the diaphragm 1.

As can be seen more clearly in FIG. 5, the flanks 4a of the fingers 4 may come into contact with the edges 26a of the indentations 26. In practice, on account of manufacturing tolerances, it is possible that just one of the edges 26a will come into contact with a flank 4a of a finger 4. In any case, the diaphragm 1 and the rotating race 16 rotate as one.

The embodiment depicted in FIGS. 6 and 7 is similar to the one in the previous figures except that instead of indentations, the rotating inner race 16 has three protrusions 27 which project and are in the form of pins between two adjacent fingers 4 of the diaphragm 1. The protrusions 27 are radially oblong in shape, and have very small circumferential sizes which means that they can be lodged in any one of the slits 5 that separate the fingers 4 of the diaphragm 1. The thickness of the protrusions 27 is less than that of the fingers 4 of the diaphragm 1, and these protrusions are radially oblong in shape to ensure good contact with the said fingers.

The embodiment illustrated in FIGS. 8 and 9 is similar to the one in FIGS. 6 and 7 except that the protrusions 127 are obtained by puncturing the metal sheet leading to the formation of protrusions 127 in the form of inclined lugs. A radial corner edge of each inclined lug 127 projects out and is designed to engage with one of the flanks 4a of a finger 4, and extends parallel to the said flank 4a. As will have been understood, in FIGS. 6 to 9, the material is upset outwards without removing chips and the protrusions 27, 127 are parallel to the flanks 4a.

In FIGS. 3 to 5, the material is upset inwards without removing chips, and the edges 26a of the indentations are parallel to the flanks 4a.

Of course the structures could be reversed, and so in FIG. 10, the clutch-release device comprises a diaphragm 1 identical to the one in FIGS. 1 and 2 and a thrust bearing 11 which differs slightly from the one in FIGS. 3 to 5 in that it has a thrust rolling bearing 13 which has a rotating outer race 16 and a non-rotating inner race 17, between which a row of balls 18 is arranged. The rotating race 16 supports, on the same side as the operating element 14, a seal 20. At its opposite end, the rotating race 16 has a rounded radial portion 25 in contact with the fingers 4 of the diaphragm 1. A number of indentations 26 are provided by upsetting the material that forms the radial portion 25. A finger 4 can become lodged in each indentation 26.

The operating element 14 made of synthetic material, is provided on its outwardly pointing radial collar 23 with a metal reinforcing plate 29 in contact with the control member 15 which is also in the form of a clutch-release fork. Situated radially between the tubular portion 22 of the operating element 14 and the non-rotating race 17 is an elastic self-alignment member 30 allowing the rolling bearing 13 to shift radially with respect to the operating member 14 and self-centring it with respect to the diaphragm. The self-alignment elastic member 30 projects axially beyond the end of the non-rotating race 17, in the direction of the rotating race 16 to form a labyrinth seal 31. Of course the present invention is not restricted to the embodiments described.

In particular, the protrusions 27, 127 may have different axial heights so that the diaphragm fingers that project axially the most do not necessarily interact with the protrusions.

Furthermore, in an embodiment of the kind shown in FIGS. 3 to 5, it is possible to provide three indentations distributed at 120° from one another.

By virtue of the invention, an economical clutch-release device is obtained in which the rolling bearing and the diaphragm have an extended life because of the rotational connection between the diaphragm and the rotating race and which puts less stress on the clutch casing, while at the same time being suited to any type of diaphragm, especially internally, it being possible for the clutch-release device according to the invention to operate with a diaphragm with narrowed slits.

As will have been understood, by fitting the clutch with a device that compensates for wear of its friction linings, known as a self-adjustment device, it can be guaranteed that the diaphragm will always be in the same position when the clutch is engaged and that the width of the slits will never decrease so much that the ends of the diaphragm fingers will be able to pinch the deformations when these deformations consist of an outwards upsetting of material.

It will be noted that the oblong shape of the pins or of the inclined lugs makes it possible to have a good area for contact with the diaphragm fingers.

We claim:

1. Clutch-release device comprising a centrally holed diaphragm (1) which has a central part divided, by means of slits (5) into fingers (4) that point radially inwards, a thrust rolling bearing (13) and an operating element (14) which, in use, is mounted on a mounting part which is distinct from a supporting part supporting the diaphragm, and said operating element being in at least axial contact with the rolling bearing, and said rolling bearing comprising a rotating race (16), a radial portion of which bears against an internal end of the diaphragm fingers, a non-rotating race (17), a radial portion of which is in contact with said operating element, and a row of rolling bodies (18) positioned within said rolling bearing, and wherein the rotating race is a pressed sheet metal rotating race that has a radial portion which is in contact with the diaphragm, and said radial portion contacting said diaphragm comprises at least one axial deformation which is obtained without removing material, and which axial deformation has circumferentially spaced side edges for interacting with flanks of said diaphragm fingers, with the axial extension of said circumferentially spaced side edges being less than the axial thickness of an interacting diaphragm finger.

2. Device according to claim 1, characterized in that the said axial deformation is an inwardly extending upset material indentation, which indentation extends inward toward the rolling bodies (18) of the said bearing.

3. Device according to claim 2, characterized in that the indentation (26) forms a radial groove with a circumferential width greater than that of a diaphragm finger.

4. Device according to claim 1, characterized in that the deformation is an outwardly extending upset material protrusion, which protrusion extends out away from the rolling bodies (18) of the said bearing.

5. Device according to claim 4, characterized in that the deformation forms a protrusion (27, 127) smaller in circumferential thickness than the circumferential space separating two adjacent diaphragm fingers.

6. Device according to claim 5, characterized in that the deformation comprises a pin (27) that is radially oblong in shape.

7. Device according to claim 5, characterized in that the deformation (127) comprises an inclined lug with a radial corner edge parallel to the flank (4a) of a finger (4) of the diaphragm (1).

8. Device according to claim 5 characterized in that the protrusions have different axial heights with respect to one another.

9. Device according to claim 1, characterized in that the side edges (26a) of the deformation are parallel to the flanks (4a) of the interacting finger (4).

10. Device according to claim 1, characterized in that the deformation has an axial height that is less than half the thickness of a diaphragm finger.

11. Device according to claim 1, characterized in that the rotating race comprises two diametrically opposed deformations.

12. Device according to claim 1, characterized in that the rotating race comprises three deformations uniformly spaced apart in the circumferential direction.

13. Device according to claim 1, characterized in that the operating element is dimensioned so that in use, said operating element is slideably mounted on a guide tube forming a component of the mounting part.

14. Clutch-release device, comprising:

a centrally holed diaphragm which has a central part that is split up into radial fingers by slits;

a thrust rolling bearing;

an operating element which, in use, is mounted on a part which is distinct from one supporting said diaphragm, and which is in at least axial contact with said thrust rolling bearing, said thrust roller bearing comprising
  (i) a rotating race, a radial portion of which bears against an internal end of at least some of said radial fingers, and said rotating race being a pressed sheet metal rotating race,
  (ii) a non-rotating race, with a radial portion of said non-rotating race being in contact with the operating element, and
  (iii) a row of rolling bodies, and wherein the radial portion of said rotating race in contact with the diaphragm comprises at least one axial deformation which is obtained without removing material, and edges of said at least one axial deformation being adapted for interaction with flanks of said diaphragm fingers, and said edges of the deformation being lesser in axial extension than an axial thickness of an interacting diaphragm finger.

15. Device according to claim 14, characterized in that said axial deformation is an inwardly extending upset of material indentation, which indentation extends inwardly toward the rolling bodies of the said bearing.

16. Device according to claim 15, characterized in that the indentation forms a radial groove with a circumferential width greater than that of a diaphragm finger to be received in said radial groove.

17. Device according to claim 14, characterized in that the deformation is an outwardly extending upset of material protrusion which protrusion extends out away from the rolling bodies of the said bearing.

18. Device according to claim 14, characterized in that the deformation forms a protrusion smaller in circumferential thickness than the circumferential space separating two adjacent diaphragm fingers and positioned for reception of said protrusion.

19. Device according to claim 18, characterized in that the deformation comprises a pin that is radially oblong in shape.

20. Device according to claim 18, characterized in that the deformation comprises an inclined lug with a radial corner edge parallel to the flank of a finger of said diaphragm.

21. Device according to claim 18 characterized in that the protrusions have different axial heights with respect to one another.

22. Device according to claim 14, characterized in that side edges of the deformation are parallel to flanks (4a) of a corresponding finger.

23. Device according to claim 14, characterized in that deformation has an axial height that is less than half the thickness of the interacting diaphragm finger.

24. Device according to claim 14, characterized in that the rotating race comprises a plurality of circumferentially spaced deformations.

25. Thrust rolling bearing for attachment with a clutch-release device with the clutch-release device having a centrally holed diaphragm which has a central part that is split up by slits into inwardly directed radial fingers, and an operating element which, in use, is mounted on a part which is distinct from one supporting the diaphragm and is adapted to be in at least axial contact with said thrust rolling bearing, said thrust roller bearing comprising:
  a rotating race, a radial portion of which is adapted to contact and bear against an internal end of at least some of the radial fingers of the diaphragm, and said rotating race being a pressed sheet metal rotating race;
  a non-rotating race adapted to contact the operating element; and
  a row of rolling bodies in contact with said rotating race, and
  wherein the diaphragm contacting radial portion of said rotating race comprises at least one axial deformation which is obtained without removing material, and edges of said at least one axial deformation are designed for interaction with flanks of the diaphragm fingers, and said edges of the deformation being lesser in axial extension than that of a diaphragm finger to interact with said axial deformation.

26. Thrust roller bearing according to claim 25, characterized in that said axial deformation is an inwardly extending upset of material indentation, which indentation extends inwardly toward the rolling bodies of the said bearing.

27. Thrust roller bearing according to claim 25, characterized in that the indentation forms a radial groove with a circumferential width greater than that of a diaphragm finger to be received in said radial groove.

28. Thrust roller bearing according to claim 25, characterized in that the deformation is an outwardly extending upset of material protrusion which protrusion extends out away from the rolling bodies of the said bearing.

29. Thrust roller bearing according to claim 25, characterized in that the deformation forms a protrusion smaller in circumferential thickness than the circumferential space separating two adjacent diaphragm fingers positioned for reception of said protrusion.

30. Thrust roller bearing according to claim 25, characterized in that the deformation has an axial height that is less than half the thickness of a diaphragm finger positioned for interaction with the deformation when said bearing is in use.

31. Clutch-release device comprising a centrally holed diaphragm (1) which has a central part cut, by means of slits (5) into fingers (4) that point radially inwards, a thrust rolling bearing (13) and an operating element (14) mounted on a part which is distinct from the one supporting the diaphragm and in at least axial contact with the rolling bearing, the said rolling bearing comprising a rotating race (16), a radial portion of which bears against the internal end of the diaphragm fingers, a non-rotating race (17), a radial portion of which is in contact with the operating element, and a row of rolling bodies (18), characterized in that the rotating race, made of pressed sheet metal, on its radial portion in contact with the diaphragm comprises at least one axial deformation which is obtained without removing material, and the edges of which are capable of interacting with the flanks of one diaphragm finger, the deformation being smaller in size than the thickness of a diaphragm finger, and wherein the deformation is achieved by upsetting material outwards, away from the rolling bodies (18) of the said bearing, leading to the formation of a protrusion (27, 127), with the deformation forming a protrusion (27, 127) that is smaller in size than the circumferential space separating two adjacent diaphragm fingers, and the deformation (127) consists of an inclined lug with a radial corner edge parallel to the flank (4a) of a finger (4) of the diaphragm (1).

\* \* \* \* \*